Patented June 30, 1936

2,046,158

UNITED STATES PATENT OFFICE 2,046,158

METHOD OF PREPARING COFFEE

Herbert C. Gore, Scarsdale, Quick Landis, New York, and Charles N. Frey, Scarsdale, N. Y., assignors to Standard Brands Incorporated, New York, N. Y., a corporation of Delaware No Drawing. Application June 24, 1932,
Serial No. 619,124

6 Claims. (Cl. 99—152)

This invention relates to a method for preparing coffee and, more particularly, to a method of handling and treating coffee from the time it leaves the roaster until ready for distribution to retard the loss of aroma.

Prior to the present invention it has been recognized that the staling of coffee is largely due to the loss of volatile constituents commonly termed "aroma" which are rapidly carried away by evolved gases comprising chiefly carbon dioxide and to oxidation of various of the constituents of the aroma. Various attempts have accordingly been made to retard the evolution of such gases and to reduce the tendency to oxidation. These attempts, however, have not been entirely satisfactory and have resulted in a development of various expensive delivery systems to place the coffee in the hands of the consumers in the shortest possible time after its preparation. The present invention efficiently attains results heretofore not obtained and insures the distribution to consumers of fresh coffee having long keeping qualities.

A general object of the invention is the provision of a method in accordance with which coffee may be transferred from a roaster to a grinding mill, ground, packed and stored with efficient retardation in the loss of volatile constituents or aroma attributable chiefly to the affects of humidity, oxidation and evolution of gases, such as, carbon dioxide and insures the production of coffee having long keeping qualities.

A more specific object of the invention is the provision of a method for grinding, storing and packing coffee at reduced temperatures, such as, normal cold storage temperatures whereby oxidation and evolution of gases which carry with them a large proportion of the aroma are materially reduced.

Another object of the invention is the provision of a method which insures substantial exclusion of oxygen and of moisture from the time the coffee leaves the roaster until it is packed and distributed.

A further object of the invention is the provision of a method of grinding which prevents contact between the coffee and sources of oxygen and/or moisture, and insures a grade of grind that is less conducive to the evolution of gases and volatile constituents.

Other objects of the invention will in part be obvious and will in part appear hereinafter.

The invention accordingly comprises the several steps and the relation of one or more of such steps with respect to each of the others thereof, which will be exemplified in the methods hereinafter disclosed, and the scope of the invention will be indicated in the claims.

We have found that various features of the operations involved in the transfer of coffee from roasters, the preparation for consumption and packing, and the distribution and storing attendant thereon necessary to place the coffee in the hands of consumers, are conducive to and attended by the evolution of large volumes of gases, chiefly carbon dioxide, which carry with them a considerable proportion of the aroma. This evolution commences during the roasting period and continues even after the roasted coffee is packed in hermetically sealed packages. This evolution is greatly augmented by grinding and the rate is increased by the presence of moisture which apparently softens the cell walls and more readily allows the escape of gases contained in the cells under pressure.

We have also found that fresh roasted coffee beans ordinarily contain not more than about between 1 to 2 per cent. of oxygen, and that oxygen, is absorbed by the coffee during the processes of grinding and packing, the absorption of oxygen being augmented by warm temperatures, fine grinding and moisture absorption. Accordingly loss of aroma due to oxidation might be prevented by excluding oxygen, or a source of oxygen, such as air, during the time the coffee is released from the roaster until it is packed and by insuring a minimum of fine particles in grinding and processing and storing the coffee at cool temperatures.

In the practice of the invention we have shown that evolution of gas and absorption of oxygen and moisture are closely related to the temperature, that is, the higher the temperature the higher are the rates of evolution and absorption of oxygen and moisture, and that such evolution can be materially reduced by the maintenance of low temperatures, more particularly, temperatures normally designated "cold storage temperatures". The present invention accordingly contemplates the maintenance of temperatures substantially lower than normal room temperatures, such as temperatures between about −112° F. and 50° F. preferably temperatures near the freezing point of water or a few degrees above, such as normal cold storage temperatures between about 32° F. and 50° F., throughout the grinding, packing and storing of the coffee, that is, from the time the coffee is cooled after leaving the roaster until it is ready for distribution. Further, since humidity has a material effect upon the evolution of gas and absorption of oxygen the coffee is transferred from the roaster to the grinding mill, ground, and passed from the grinding mill into packages and stored with substantial exclusion of moisture.

Inasmuch as carbon dioxide is formed and evolved during the roasting process, the whole roasted beans are soon surrounded by a dry atmosphere of carbon dioxide which may be maintained until the beans are placed in the grinding mill. The grinding mill may be enclosed and the exclusion of moisture insured by grinding in a vacuum, in an atmosphere of inert gas, such as carbon dioxide, or in dry air. The inert gas atmosphere in the grinding mill may be obtained by placing in the mill a quantity of solid carbon dioxide which will be rapidly converted into carbon dioxide gas, and will maintain an inert atmosphere about the coffee. Such a procedure eliminates the necessity of enclosing the mill since carbon dioxide is heavier than air.

An atmosphere of dry air, or inert gas is preferred in the grinding mill since such procedure allows a ready transfer from the mill to packages with substantial exclusion of moisture. If a vacuum is used in the grinding mill, difficulties in transferring the ground coffee to packages are encountered.

We have found, too, that the rate of evolution of gases from coarsely and uniformly ground coffee is much less than that from finely ground coffee or a non-uniform grind containing a large percentage of fine particles. Therefore, the present invention further contemplates a relatively coarse and uniform grade of grinding in addition to the maintenance of low temperatures and substantial exclusion of moisture. It is preferred also that the grinding be effected with a minimum of shock during the crushing or grinding operation.

The use of inert gas while transferring the coffee from the roaster to the grinding mill, grinding and placing the coffee in packages will provide a substantial exclusion of oxygen and prevent oxidation of constituents of the aroma. The oxygen content of the evolved gases has been found in some cases to be as high as about 20 per cent, and to be much greater in those arising from finely ground grades than in those evolved from coarsely and uniformly ground grades. This increase in the oxygen content appears to be due to the contact of the coffee with atmospheric air especially when the moisture content is high, particularly during the process of grinding, and the operations attendant upon packing. The present invention substantially decreases the loss of aroma due to oxidation by providing for a substantial exclusion of oxygen and moisture during the steps of passing the coffee to the grinding mill, grinding, packing and storing.

By way of brief recapitulation the method of the present invention includes the features of coarsely and uniformly grinding, packing and storing roasted coffee at low temperatures with the substantial exclusion of oxygen and moisture, the transferring from the roaster to the grinding mill and from the latter to packages, to be carried out in a manner such that sources of oxygen and/or moisture are excluded and the low temperatures are maintained.

It is to be understood that if treatments or operations other than those mentioned above are to be practiced or interposed between the time when the coffee is released from the roaster until it is packed and stored, such as, for example, screening and weighing, such operations could be carried out in accordance with the teachings of the present invention in order to insure the maintenance of low temperatures and a substantial exclusion of oxygen and/or moisture. The terms (1) "low temperatures", (2) "normal room temperatures" and (3) "cold storage temperatures" are intended to cover respectively, (1) temperatures substantially below those at which the usual steps of grinding, packing and storing coffee are performed, viz., —112° F. to 50° F., (2) the range of temperatures usually designated as room temperatures within a few degrees of about 70° F., and (3) temperatures usually used for cold storage purposes ordinarily within the range of between about 32° F. and 50° F.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. The method of preparing coffee which comprises transferring coffee from a roaster to a grinding mill, coarsely and uniformly grinding in an inert gas, transferring ground coffee to packages, storing the packed coffee, oxygen and moisture being excluded throughout by the use of an atmosphere of an inert gas, cooling to a temperature of between about 32° F. and 50° F. in the inert atmosphere and maintaining at such temperatures from a time prior to the grinding of the coffee.

2. A method of producing a stabilized coffee which consists in roasting the coffee beans and then promptly surrounding the hot coffee beans with an inert gas so that the hot coffee beans cannot take up oxygen by cooling in the presence of oxygen, and then grinding the coffee beans and allowing the coffee to slowly cool, said grinding and slow cooling being carried out in an inert atmosphere and with the substantial exclusion of oxygen, so that the coffee can slowly take up the inert gas before the ground coffee has cooled, and the ground coffee subsequently retains said inert gas.

3. The method of preparing coffee which comprises transferring coffee from a roaster to a grinding mill, coarsely and uniformly grinding in an inert gas, transferring ground coffee to packages, storing the packed coffee, oxygen and moisture being excluded throughout by the use of an atmosphere of inert gas, cooling to a temperature of between about —112° F. and 50° F. in the inert atmosphere and maintaining at such temperatures from a time prior to the grinding of the coffee.

4. A method of producing a stabilized coffee comprising roasting coffee beans and then promptly surrounding the hot coffee beans with an inert gas so that the hot coffee beans cannot take up oxygen by cooling in the presence of oxygen, grinding the coffee beans in an inert atmosphere with the substantial exclusion of oxygen, transferring the roasted coffee from the roaster to the grinder and from the grinder while being surrounded with inert gas with the substantial exclusion of oxygen, and slowly cooling the coffee subsequent to the roasting to a temperature substantially below normal room temperature so that the coffee will take up and retain said inert gas.

5. A method of producing and handling a stabilized coffee comprising roasting coffee beans, promptly surrounding them with an inert gas, grinding the coffee beans, packing the coffee subsequent to grinding, maintaining said coffee in an atmosphere of inert gas with the substantial exclusion of oxygen throughout said steps from the time it is first surrounded with inert gas including transfers to the grinder and to the packages, cooling said coffee subsequent to the roasting to a temperature substantially below normal room temperature so that said coffee will take up and retain the inert gas, keeping the coffee at temperatures substantially below normal room temperature throughout the steps subsequent to the cooling, and storing the packed coffee at a similar low temperature.

6. A method of producing a stabilized coffee comprising roasting coffee beans, grinding the coffee beans, packing the coffee subsequent to grinding, cooling said coffee subsequent to the roasting to a temperature substantially below normal room temperature and maintaining the coffee at such low temperatures throughout all of the steps subsequent to the initial cooling, all steps including transfers from the roaster and from the grinder until the coffee is packed being carried out in an atmosphere of inert gas with the substantial exclusion of moisture and oxygen so as to prevent the coffee from taking up oxygen and to cause the coffee to take up and retain the inert gas.

HERBERT C. GORE.
QUICK LANDIS.
CHARLES N. FREY.